United States Patent [19]

Medsker, II et al.

[11] Patent Number: 5,436,280
[45] Date of Patent: Jul. 25, 1995

[54] BI(PHOSPHINE) PHOTOINITIATORS AND CHAIN TRANSFER AGENTS

[75] Inventors: Robert E. Medsker, II, Mooresville, Ind.; H. James Harwood, Stow, Ohio

[73] Assignee: Edison Polymer Innovation Corp., Brecksville, Ohio

[21] Appl. No.: 153,644

[22] Filed: Nov. 17, 1993

[51] Int. Cl.$^6$ ............................... C08F 2/46
[52] U.S. Cl. ............................... 522/55; 522/49; 522/64; 568/8; 526/193
[58] Field of Search ............... 522/64, 55, 49; 568/8; 526/193

[56] References Cited

U.S. PATENT DOCUMENTS 3,012,075 12/1961 Niebergall .................. 568/8
4,009,116 2/1977 Bahr ........................ 526/329
4,082,724 4/1978 Hewertson .................. 260/75 P

OTHER PUBLICATIONS

Chem. Abstracts—Emoto et al "Oxidation of Diphosphine Dioxides . . . " vol. 79, No. 3, Abstract #17797u, p. 382, 1973.
Keck et al. Chem. Abstracts—"Mass Spectrometric . . . ", vol. 92, No. 3, p. 611, 1980, Abst. No. 21626y.
Kawashima et. al. "Synthesis and Thermolysis . . . Disulfides", vol. 99, No. 25, p. 653. Abst. No. 212602s, 1983.
Angelo et al. "Photochemical Reactions . . . ", vol. 103, No. 5, p. 522, Abst. No. 37548f.

*Primary Examiner*—Mark A. Chapman
*Attorney, Agent, or Firm*—Hudak & Shunk Co.

[57] ABSTRACT

Vinyl monomers are polymerized in the presence of bi(phosphine oxides) and bi(phosphine sulfides) which can function as photoinitiators and chain transfer agents in the polymerization of vinyl monomers. The incorporation of such organo-phosphorous compounds into such polymers either as an integral part thereof, or as an admixture, results in improved thermal stability of the polymers.

24 Claims, No Drawings

BI(PHOSPHINE) PHOTOINITIATORS AND CHAIN TRANSFER AGENTS

TECHNICAL FIELD

This invention relates to pentavalent phosphorus compounds useful as a source of free radicals in the polymerization of vinyl monomers. More particularly, this invention relates to organo-phosphorus compounds that are able to function as chain transfer agents, as well as photoinitiators. Specifically, this invention relates to bi(phosphine) compounds capable of participating in chain transfer and initiation reactions, thereby forming phosphinyl radicals which initiate the polymerization of new polymer chains and which confer superior flame retardancy to polymer chains in which they become an integral part.

BACKGROUND OF THE INVENTION

Due to their hydrocarbon nature, many of the synthetic polymers widely used today are also undesirably flammable. In view of their widespread use, this characteristic has contributed to a significant fire hazard, and as a consequence, there have been many attempts in the past to increase the flame resistance of such polymers. In order to minimize the fire potential, for example, chemicals recognized for their ability to impart fire retardancy have often been mechanically incorporated with hydrocarbon polymers to form polymer compounds resistant to fire. Fire retardant compounds containing phosphorus, for example, have frequently been used for this purpose. While such compounds have proven effective in increasing the flame resistance of hydrocarbon polymers in which they are present, homogeneous mixtures of the retardants in polymers are often difficult to prepare. In addition, the incorporation of fire retardants in the polymers requires an additional processing step, that of mixing, which is both time consuming and expensive. In order to avoid such drawbacks in polymerization reactions that proceed by free radical mechanisms, there have been attempts to find organo-phosphorus compounds capable of participating directly in the polymerization reaction itself. For example, organo-phosphorus compounds have been successfully employed as monomers; as chain transfer agents, and as polymerization initiators. Such attempts have disclosed that some phosphoric acid and phosphinic acid derivatives having vinyl or alkyl substituents therein, for instance, are capable of polymerizing or copolymerizing in the presence of free radical initiators. Toy, Chem. Eng. News, 25, No. 28, 2030, 1947.

In addition, organo-phosphorus compounds have been used as comonomers to incorporate phosphorus atoms into the backbone of polymers, and in this connection, a number of monomers have been polymerized in the presence of phosphorus compounds having the formula $RPX_2$, where R is organic, and X is chlorine or bromine; U.S. Pat. Nos. 2,671,077; '078; '079; and '080.

Apart from their ability to impart flame retardancy in polymers in which they are incorporated, a further desirable characteristic of phosphorus compounds containing PH and PX bonds is their ability to act as chain transfer agents. In such capacity, they are useful in achieving molecular weight control, as well as for the purpose of reducing unwanted cross-linking. The utility of trivalent phosphorus compounds having labile hydrogens on free radical polymerizations, for example, has previously been studied, Pellon, *Journal of Polymer Science*, 43, 537, 1960.

A still further use for phosphorus-containing compounds in free radical polymerizations is in the capacity of photoinitiators. In this regard, the acylphosphine oxides and related compounds have been employed as effective photoinitiators for various unsaturated systems; Baxter & Davidson, Polymer, 29, 1569, 1988. For instance, the acylphosphine oxides have a relatively strong absorption in the 300–400 nm region which enables them to absorb U.V. light at the point where pigments such as titanium dioxide are relatively transparent.

In view of the foregoing, therefore, it is a first aspect of this invention to provide improved phosphorus compounds that are useful as flame retardants for hydrocarbon polymers.

A second aspect of this invention is to provide pentavalent phosphorus compounds that function to incorporate higher levels of phosphorus as an integral part of polymer chains.

Another aspect of this invention is to provide bi(phosphine) compounds that serve as chain transfer agents.

A further aspect of this invention is to provide bi(phosphine) compounds that yield radicals upon photolysis which possess a high degree of polymerization-initiating capability.

Another aspect of this invention is to provide bi(phosphine) compounds that enhance the thermal stability of hydrocarbon polymers in which they are physically incorporated.

An additional aspect of this invention is to provide phosphorus-containing vinyl polymers having a greater affinity for metal surfaces.

Yet another aspect of this invention is to provide phosphorus-containing vinyl polymers possessing improved thermal and oxidative stability.

A still further aspect of this invention is to provide a pentavalent phosphorus compound that yields two phosphorus-containing radicals upon its decomposition.

BRIEF DESCRIPTION OF THE INVENTION

The preceding and other aspects of the invention are provided by the process of polymerizing a vinyl monomer by a free radical polymerization mechanism in a reaction mixture which includes a bi(phosphine) compound having the formula:

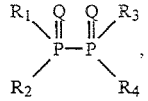

where Q is oxygen or sulphur, and the $R_1$, $R_2$, $R_3$ and $R_4$ groups are alkyl, alkenyl, aryl, or substituted alkyl, alkenyl or aryl derivatives, and may include functional groups such as carboxyl, hydroxyl, ester, amino, amide, isocyanate, oxirane, trialkoxysilyl and the like, and may be the same or different.

The preceding and further aspects of the invention are provided by a polymer produced by the process of the preceding paragraph.

The preceding and additional aspects of the invention are provided by organic polymers having improved thermal stability as a consequence of bi(phosphine sulfide) incorporated therein.

DETAILED DESCRIPTION OF THE INVENTION

As previously indicated, the invention disclosed herein relates to phosphorus compounds that are useful as chain transfer agents. The compounds also function as photoinitiators during photolysis, however, and when so used, serve as infers since they not only generate free radicals upon exposure to radiation, but simultaneously facilitate chain transfer reactions.

The compounds to which the processes of the invention are directed have the formula:

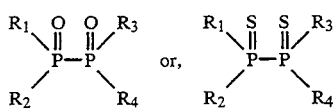

For example, tetramethyl bi(phosphine sulfide), one of the bi(phosphine) compounds of the invention is believed to proceed as a chain transfer agent with methyl methacrylate monomer according to the following reaction:

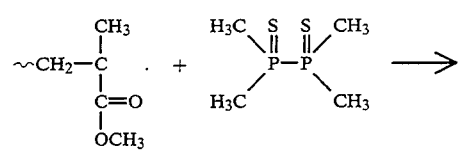

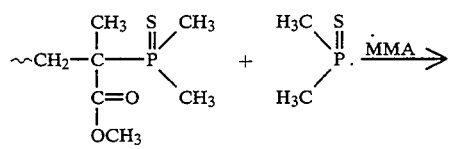

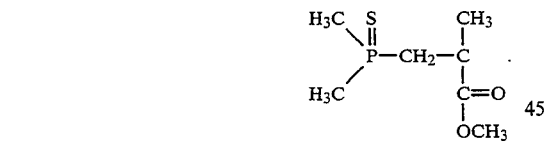

Chain transfer can be represented as a competition between the monomer and the transfer agent for propagating polymer radicals. Where $k_{tr}$ is the rate constant of the transfer reaction, and $k_p$ is the rate constant of the propagation reaction, the chain transfer constant $C_{tr}$ is the ratio of the chain transfer rate constant, $k_{tr}$ and the propagation rate constant $k_p$. The chain transfer constant can be determined graphically using the Mayo equation, where $(1/X_n) = (1/X_n)_o + C_{tr}[S]/[M]$, in which $C_{tr}$ is determined as a slope of the linear plot of the reciprocal of the degree of polymerization $(1/X_n)$ versus the ratio of the initial concentration of transfer agent to monomer concentration $[S]/[M]$, and wherein $(1/X_n)_o$ is the degree of polymerization obtained in the absence of the chain transfer agent. The competition referred to above can be illustrated by the following equation in which R-H is the chain transfer agent and the monomer is styrene.

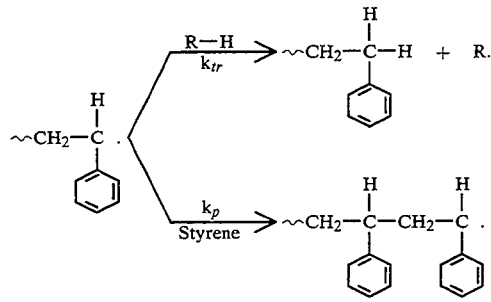

The bi(phosphine) compounds of the invention have desirably large transfer constants when compared to many common chain transfer agents as may be gathered from the following Table I.

TABLE I

| Transfer Agent | Monomer | $C_{tr}$ |
|---|---|---|
| Tetramethyl Bi(Phosphine Sulfide) | MMA | 0.14 |
| Cyclohexane | MMA | $7.5 \times 10^{-6}$ |
| Benzene | MMA | $1.0 \times 10^{-5}$ |
| Toluene | MMA | $5.2 \times 10^{-5}$ |
| Ethyl Acetate | MMA | $2.4 \times 10^{-5}$ |
| Carbon Tetrachloride | MMA | $2.4 \times 10^{-4}$ |
| Tetrachloroethane | MMA | $2 \times 10^{-5}$ |

Similarly, in the case of photoinitiation, for example, as shown by the photolysis of tetraphenyl bi(phosphine oxide) which proceeds to produce two diphenyl phosphinyl radicals according to the following reaction,

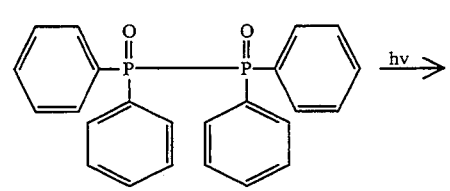

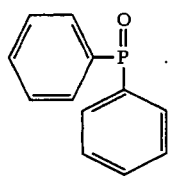

the rate constant for initiation of polymerization reactions has been determined to be on the order of $10^6$ l/moles/sec. to $10^8$ l/moles/sec. Such values are approximately 10 to 1,000 times better, for instance, than the values of rate constants for the addition of 2,4,6-trimethylbenzoyl radical to monomers, i.e., $10^5$ l/moles/sec.

As will be appreciated from the preceding, phosphorus-centered radicals are substantially more reactive than many carbon-centered radicals, which makes them very effective in the re-initiation step that occurs during chain transfer, as well as during photochemical reactions. The radicals resulting from decomposition of the bi(phosphine) compounds disclosed herein are not only characterized by such attributes, but display the further advantage of yielding two, rather than one, phosphorus-centered radicals for each mole of the bi(phosphine) compound employed in a polymerization reaction. Such additional phosphorus-containing radicals assure that more phosphorus will be incorporated into the forming polymer chain, and also offer the advantage of doubling the amount of the more active phosphorus-containing radicals able to take part in the polymerization reaction.

With respect to operable compounds, for purposes of the invention the R substituents of the bi(phosphine) compounds disclosed herein may vary considerably. For example, $R_1$, $R_2$, $R_3$ and $R_4$ may be the same or different and may be selected from alkyl, alkenyl, aryl, or their substituted derivatives. Such groups may contain one or more of carbon, oxygen, nitrogen or sulfur, for example, methyl, ethyl, phenyl, p-carboxyphenyl, p-isocyanatophenyl, p-isothiocyanatophenyl, p-t-butylthiophenyl, chloroethyl, hydroxyethyl, carboxyethyl, aminoethyl, acetamidoethyl, isocyanatoethyl, glycidyl, trimethoxysilylpropyl and others. Among the preferred groups, however, may be mentioned methyl, ethyl, propyl, butyl, pentyl, hexyl, phenyl radicals, and mixtures of them.

Specifically, suitable bi(phosphine sulfides) include tetramethyl bi(phosphine sulfide); tetraethyl bi(phosphine sulfide); tetrapropyl bi(phosphine sulfide); tetrabutyl bi(phosphine sulfide); tetrapentyl bi(phosphine sulfide); tetrahexyl bi(phosphine sulfide); 1,2-dimethyl-1,2-dipropyl bi(phosphine sulfide); 1,2-dimethyl-1,2-diphenyl bi(phosphine sulfide); and 1,2-dimethyl-1,2-di(p-hydroxyphenyl) bi(phosphine sulfide), other similar bi(phosphine sulfides) also being useful.

Illustrative examples of bi(phosphine oxides) are tetramethyl bi(phosphine oxide); tetraethyl bi(phosphine oxide); tetrapropyl bi(phosphine oxide); tetrabutyl bi(phosphine oxide); tetrapentyl bi(phosphine oxide); tetrahexyl bi(phosphine oxide); 1,2-dimethyl-1,2-dipropyl bi(phosphine oxide); 1,2-dimethyl-1,2-diphenyl bi(phosphine oxide); and 1,2-dimethyl-1,2-di(phydroxyphenyl) bi(phosphine oxide), although other similar bi(phosphine) compounds are also suitable.

In one embodiment, free radical polymerizations of vinyl unsaturated monomers may be conducted with chain transfer agents of the invention initiated by a suitable agent of the types well known in the art, for example, azobisisobutyronitrile, AIBN, activated by the application of heat. A small amount of the initiator, for instance, 0.5 mole percent calculated on the monomer present although greater or lesser amounts may be used, is typical.

The desired bi(phosphine) compound is introduced in an amount ranging, for example, from 0.1 to about 10 mole percent, based on the monomer present. The temperature of the polymerization will depend upon the activation temperature of the initiator agent, the nature of the monomer and similar considerations, a common polymerization temperature being from about 50 to 80 degrees centigrade. The polymerization is allowed to proceed in an inert atmosphere to the conversion desired, usually the point at which a high conversion is obtained.

In the case of polymerizations conducted with photolysis, the bi(phosphine) photoinitiator of the invention selected is charged to the monomer, commonly to provide a concentration of from about 0.015 to about 0.06 moles per mole of monomer present. Again, the reaction mixture is maintained in an inert atmosphere to avoid the contaminating presence of oxygen which would interfere with the reaction. Following its formulation, the reaction mixture is continuously irradiated with a light source, for instance, one having a wavelength maximum of 254 nm. While the wavelength of the activating radiation may be varied, it is desirable to expose the reaction mixture to a wavelength that is not appreciably absorbed by the monomer being polymerized, a fact readily determined from the literature or by experimentation. The radiation times will depend upon the circumstances, for instance, the monomer being used, and the initiator; however, a period of irradiation of from about 1 to 48, more preferably from about 12 to 48, hours is typical.

The bi(phosphine) compounds of the invention can be successfully employed with any of a wide variety of vinyl monomers such as, for example, methyl acrylate, methyl methacrylate, styrene, vinyl acetate, vinyl chloride, vinyl esters, and others.

While the bi(phosphine) compounds of the invention have the uses above-described, when $R_1$, $R_2$, $R_3$ and $R_4$ are functionalized, for example, with COOH, COOR, OH, $NH_2$, oxirane, the compounds may also be used in the synthesis of telechelic polymers as illustrated in the following.

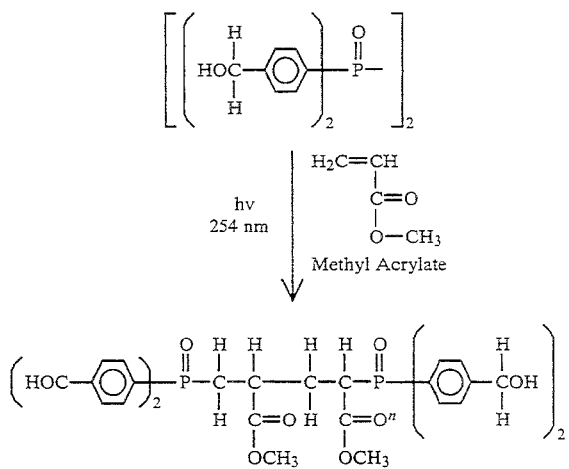

A further advantage of employing bi(phosphine) chain transfer agents of the type described arises from the fact that the chain transfer mechanism appears to take precedence over chain termination processes that occur by radical coupling, or by disproportionation. The thermal behavior, for example, of AIBN-initiated poly(methyl methacrylate) has been explained in terms of weak links formed in the termination reaction which are thermally labile. It is these thermally sensitive chain ends that are eliminated by the transfer reaction between such radicals and the bi(phosphine) compounds of the invention. In any event, the thermal decomposition temperature, i.e., the temperature at which 10 percent of the polymer mass is lost, is substantially higher in the case of polymerizations conducted using the bi(phosphines) than, for example, the decomposition temperatures of AIBN-initiated polymers.

Whatever the explanation, an example of the superior thermal stability of polymers formed with the bi(phosphine) compounds of the invention is illustrated in the following Table II:

TABLE II

| TRANSFER AGENT | MOLE % CTA* | $M_n$ | TEMP. @ 10% DECOMP. |
| --- | --- | --- | --- |
| Tetramethyl Bi(Phosphine Sulfide) | 1.4 | 20,500 | 307° C. |
| Control (PMMA initiated with AIBN) | 0 | 100,000 | 270° C. |

*Chain Transfer Agent

As previously stated, a notable advantage of the compounds of the invention lies in their ability to become part of the polymer molecules themselves, thereby conferring inherent flame retardancy to the polymers directly. Alternatively, however, the organo-phosphorous compounds of the invention can also be mixed with organic polymers to provide such retardancy. In this regard, the incorporation of from about 0.1 percent to about 25 percent, more preferably from about 1 percent to about 10 percent of the organo-phosphorous compounds in polymers either by mechanical or by solution mixing, provides significant thermal stability to such polymers.

In addition to having enhanced thermal stability, the bi(phosphine) compounds of the invention can be expected to interact with metal surfaces due to the P-O or P-S bonds, as the case may be, forming a part of the compounds. These react with OH groups on metal surfaces, allowing polymers formed with the phosphines to function as enhanced metal coating materials due to the additional phosphorus present in the chains.

While not intended to be limiting in nature, the following examples are illustrative of the invention.

EXAMPLE 1

Preparation of Tetraphenyldiphosphine

A mixture of diphenylphosphinous chloride, 7.0 grams, 0.03 moles, and calcium carbide, 2.0 grams, 0.038 moles is vigorously stirred for 22 hours under a nitrogen atmosphere and at a temperature of about 160° C., care being taken to avoid oxygen and moisture contamination. The hot mixture is cooled to room temperature and mixed with dry toluene, 60 ml, at 100° C. Charcoal is then added to the solution, which is filtered while hot. The toluene is removed by evaporation using a rotary evaporator, leaving crude tetraphenyldiphosphine and unreacted diphenylphosphinous chloride. Dry ether, 60 ml, is added to the mixture to precipitate the tetraphenyldiphosphine. The solids are isolated by filtration and washed with dry, cold ether three times in order to remove any unreacted diphenylphosphinous chloride, and the remaining solids are dried in vacuo at room temperature. The product is then treated with 1 percent aqueous KOH solution and washed three times with distilled water, three times with dry ether, and then vacuum dried at 35° C. for 24 hours. The yield is 7.4 grams, 63 percent. The product is characterized by its melting point, measured as 120° C., which is in good agreement with the melting point, 120.5° C., obtained from the literature. An infrared spectrum of the product is obtained which is found to be identical to an infrared spectrum of tetraphenylbiphosphine obtained from the literature, confirming the structure of the product obtained.

EXAMPLE 2

Tetraphenyl Bi(phosphine oxide)

Approximately 7.4 grams of tetraphenyldiphosphine is dissolved in approximately 50 ml of dry toluene. An excess of oxygen, dried by passage through a 12 inch glass column packed with Drierite, is bubbled into the solution for 8 hours. The solution is thereafter passed through charcoal, and one-half of the toluene is evaporated with a rotating evaporator. The remaining solution is refrigerated overnight and the crystals formed are removed by filtration. The material is subsequently recrystallized from a toluene/ether solution, filtered and dried in a vacuum oven at 35° C. overnight. The yield is 4.1 grams, 51 percent, of material having a melting point of 169° C., a value which compares favorably to the literature value of 168°-169° C.

EXAMPLE 3

Tetraphenyl Bi(phosphine sulfide)

Elemental sulfur, 6.0 grams, 0.019 moles, is added to 50 ml of dry toluene, the toluene having been dried over 5 Angstrom Molecule Sieves overnight, and the mixture is heated to 115° C. The mixture is stirred for 10 hours under a nitrogen blanket and about 7.4 grams of tetraphenyldiphosphine is thereafter added to the solution, which is then allowed to react for approximately 8 hours. The hot solution is passed through charcoal and 50 percent of the toluene is removed using a rotating evaporator for the purpose. The remaining solution is refrigerated overnight and the crystals formed are removed by filtration. The material is then recrystallized from a toluene/ether solution, filtered and dried in a vacuum oven at 35° C. overnight. The yield is 6.1 grams, or 47 percent. The material is characterized using spectroscopy, the infrared spectrum of the product being identical with the spectrum of tetraphenyl bi(phosphine sulfide) in the literature.

EXAMPLE 4

Tetramethyl Bi(phosphine sulfide), as a Photoinitiator

A 100 ml quartz flask is charged with 10 grams, 0.10 moles, of methyl methacrylate, and 0.279 grams, 0.0015 moles, of tetramethyl bi(phosphine sulfide). The flask is sealed with a rubber septum and sparged with nitrogen for a period of about 5 minutes. The flask is subsequently continuously irradiated for 12 hours using a light source having a wavelength of 254 nm. A polymer in percent yield is obtained having a number average molecular weight of 63,700 grams per mole.

In a similar experiment in which the bi(phosphine sulfide) is absent, the polymer yield obtained is only about 7 percent.

EXAMPLE 5

1,2-Dimethyl-1,2-diphenyl Bi(phosphine sulfide) as a Photoinitiator

A 100 ml quartz flask is charged with 10 grams, 0.10 moles of methyl methacrylate, and 0.155 grams, 0.005 moles of tetramethyl bi(phosphine sulfide). The flask is sealed with a rubber septum and sparged with nitrogen gas for a period of about 5 minutes. The flask is then continuously irradiated for 12 hours using a light source having a wavelength of 254 nm. A polymer in 71 percent yield is obtained having a number average molecular weight of 41,500 grams per mole.

In a further experiment in which the bi(phosphine sulfide) is absent, a polymer yield of about 7 percent is again obtained.

EXAMPLE 6

Tetraphenyl Bi(phosphine oxide), as a Photoinitiator

A 100 ml quartz flask is charged with 10 grams, 0.10 moles of methyl methacrylate and 0.804 grams, 0.002 moles of tetraphenyl bi(phosphine sulfide). The flask is sealed with a rubber septum and sparged with nitrogen gas for a period of about 5 minutes. The flask is thereafter continuously irradiated for 46 hours using a light source having a wavelength of 254 nm. A polymer in 53 percent yield is obtained having a number average molecular weight of 23,500 grams per mole.

In a control experiment conducted in a similar manner, but in the absence of the bi(phosphine oxide), a cross-linked polymer is obtained.

EXAMPLE 7

Chain Transfer

A 1 oz. glass vial is charged with 2 grams, 0.02 moles, of methyl methacrylate, 0.0037 grams, 0.00002 moles, of tetramethyl bi(phosphine sulfide), and 0.0164 grams, 0.0001 moles of azo bis(isobutyronitrile). The vial is sealed with a rubber septum and sparged with nitrogen for a period of 5 minutes before being placed in an oil bath having a controlled temperature of 65±2° C. for a period of 4 hours. A polymer in 65 percent yield is obtained having a number average molecular weight of 34,700 grams per mole.

Further experiments are conducted using the above procedure in which, however, the concentration of tetramethyl bi(phosphine sulfide) is varied from 0.0001 moles to 0.0003 moles in 0.02 moles of methyl methacrylate monomer. The number average molecular weight is measured for each polymer obtained in these experiments. Estimates of the chain transfer constant of tetramethyl bi(phosphine sulfide) in methyl methacrylate polymerization are obtained graphically using the Mayo equation, i.e., $1/X_n = (1/X_n)_o + C_{tr}[S]/[M]$. The chain transfer constant $C_{tr}$ is determined from the slope of the plot of $1/X_n$, where $X_n$ is the number-average degree of polymerization versus the ratio of the concentration of the transfer agent [S] and monomer concentration [M]. The value obtained from these experiments is 0.14.

EXAMPLE 8

In a series of experiments showing the beneficial thermal stabilizing effect of the physical incorporation of the organo-phosphorous compounds of the invention in organic polymers, poly(methyl methacrylate), PMM, is prepared in the conventional way, using azobisisobutyronitrile, AIBN, as the initiator. Following its preparation, a sample of the polymer is subjected to thermogravimetric analysis with the results shown in Table III.

For comparison, in a separate procedure, poly(methyl methacrylate) is prepared using tetramethyl bi(phosphine sulfide), TBPS, as a photoinitiator. The results of thermogravimetric analysis of the resulting polymer are included in Table III.

Also, for comparative purposes, poly(methyl methacrylate) is prepared using AIBN as an initiator, together with 1.4 weight percent of tetramethyl bi(phosphine sulfide) as a chain transfer agent. The results of thermogravimetric analysis of the polymer thus prepared are also included in Table III.

Finally, poly(methyl methacrylate) is prepared using AIBN as an initiator. The polymer is subsequently mechanically blended with about 10 percent by weight of tetramethyl bi(phosphine sulfide) additive. The results of thermogravimetric analysis of the blended polymer are shown in Table III.

TABLE III

| Polymer | Initiator | Chain Transfer Agent | Additive | Decomposition Temp.* |
|---------|-----------|---------------------|----------|---------------------|
| PMM | AIBN | | | 270° C. |
| PMM | TBPS | | | 312° C. |
| PMM | AIBN | TBPS | | 307° C. |
| PMM | AIBN | | TBPS | 333° C. |

*Point at which sample loses 10 percent of its weight.

The results of the comparative tests reflect the fact that the mechanical incorporation of tetramethyl bi(phosphine sulfide), as well as the chemical incorporation of such material in polymers, significantly improves the thermal stability of the polymers.

While in accordance with the Patent Statutes, a preferred embodiment and best mode has been presented, the scope of the invention is not limited thereto, but rather is measured by the scope of the attached claims.

What is claimed is:

1. The process of polymerizing a vinyl monomer by a free radical polymerization mechanism in a reaction mixture that includes a bi(phosphine) derivative having the general formula:

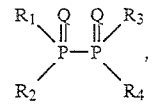

where Q is oxygen or sulfur, and $R_1$, $R_2$, $R_3$ and $R_4$ are selected from alkyl, alkenyl and aryl groups, and substituted derivatives of such groups, which groups [may]-can optionally contain one or more of carbon, oxygen, nitrogen, silicon, halogen and sulfur included in a member of the group consisting of carboxyl, hydroxyl, ester, ether, amino, amide, isocyanate, isothiocyanate, oxirane, glycidyl, alkoxysilyl, halo alkyl, halo aryl and thioether, and which said groups may be the same or different.

2. A process according to claim 1, in which the reaction mixture contains at least one component other than said bi(phosphine) compound, which initiates a polymerization thermally, photochemically or by a redox mechanism.

3. A process according to claim 1, in which $R_1$, $R_2$, $R_3$ and $R_4$ are selected from alkyl and aryl radicals, and may be the same or different.

4. A process according to claim 1 in which polymerization is initiated by photolysis.

5. A process according to claim 1 in which $R_1$, $R_2$, $R_3$ and $R_4$ contain functional groups.

6. A process according to claim 5 in which said functional group is selected from a carboxylic, ester, isocyanate, isothiocyanate, amino, trialkoxysilyl, hydroxyl, amide and oxirane group.

7. A telechelic polymer made from the product of the process according to claim 5.

8. A polymer produced by the process of claim 1.

9. A process according to claim 1 in which the monomer is selected from the group of methylacrylate, methyl methacrylate styrene, vinyl chloride and vinyl acetate.

10. The process of polymerizing a vinyl monomer by a free radical polymerization mechanism in a reaction mixture which includes a biphosphine compound having the general formula

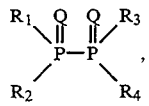

where Q is oxygen or sulfur and $R_1$, $R_2$, $R_3$ and $R_4$ are selected from alkyl and aryl and may be the same or different.

11. A process according to claim 10 in which polymerization is initiated by photolysis.

12. A process according to claim 10 in which the reaction mixture contains at least one component other than said bi(phosphine) compound, which initiates a polymerization thermally, photochemically or by a redox mechanism.

13. A vinyl monomer which includes as an admixture a bi(phosphine) derivative having the general formula:

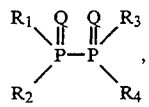

where Q is oxygen or sulfur, and $R_1$, $R_2$, $R_3$ and $R_4$ are selected from alkyl, alkenyl and aryl groups, and substituted derivatives of such groups, which groups can optionally contain one or more of carbon, oxygen, nitrogen, silicon, halogen and sulfur included in a member of the group consisting of carboxyl, hydroxyl, ester, ether, amino, amide, isocyanate, isothiocyanate, oxirane, glycidyl, alkoxysilyl, halo alkyl, halo aryl and thioether, and which said groups may be the same or different.

14. A vinyl monomer which includes as an admixture a bi(phosphine) derivative having the formula:

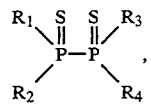

where $R_1$, $R_2$, $R_3$ and $R_4$ are selected from alkyl, alkenyl and aryl groups, and substituted derivatives of such groups, which groups can optionally contain one or more of carbon, oxygen, nitrogen, silicon, halogen and sulfur included in a member of the group consisting of carboxyl, hydroxyl, ester, ether, amino, amide, isocyanate, isothiocyanate, oxirane, glycidyl, alkoxysilyl, halo alkyl, halo aryl and thioether, and which said groups may be the same or different.

15. A polymerization using bi(phosphine derivatives) as photoinitiators to prepare polymers with improved thermal stability.

16. A chain transfer reaction using bi(phosphine derivatives) as chain transfer agents to prepare polymers with improved thermal stability.

17. The use of bi(phosphine derivatives) as additives for improving the thermal stability of polymers.

18. The use of bi(phosphine sulfides) as photoinitiators to prepare polymers with improved thermal stability.

19. The use of bi(phosphine sulfides) as chain transfer agents to prepare polymers with improved thermal stability.

20. The use of bi(phosphine sulfides) as additives for improving the thermal stability of polymers.

21. An admixture comprising a vinyl polymer and a biphosphine derivative having the general formula:

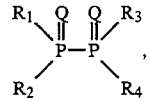

where Q is oxygen or sulfur, and $R_1$, $R_2$, $R_3$ and $R_4$ are selected from alkyl, alkenyl and aryl groups, and substituted derivatives of such groups, which groups can optionally contain one or more of carbon, oxygen, nitrogen, silicon, halogen and sulfur included in a member of the group consisting of carboxyl, hydroxyl, ester, ether, amino, amide, isocyanate, isothiocyanate, oxirane, glycidyl, alkoxysilyl, halo alkyl, halo aryl and thioether, and which said groups may be the same or different.

22. An admixture according to claim 21, in which said vinyl polymer is poly(methyl methacrylate).

23. A vinyl monomer which includes as an admixture a bi(phosphine) derivative having the formula:

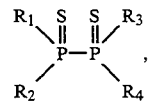

where $R_1$, $R_2$, $R_3$ and $R_4$ are selected from alkyl, alkenyl and aryl groups, and substituted derivatives of such groups, which groups can optionally contain one or more of carbon, oxygen, nitrogen, silicon, halogen and sulfur included in a member of the group consisting of carboxyl, hydroxyl, ester, ether, amino, amide, isocyanate, isothiocyanate, oxirane, glycidyl, alkoxysilyl, halo alkyl, halo aryl and thioether, and which said groups may be the same or different.

24. An admixture according to claim 23, in which said vinyl polymer is poly(methyl methacrylate).

* * * * *